US 12,124,757 B2

(12) United States Patent
Kapinos et al.

(10) Patent No.: US 12,124,757 B2
(45) Date of Patent: Oct. 22, 2024

(54) MOVEMENT OF CURSOR BETWEEN DISPLAYS BASED ON MOTION VECTORS (71) Applicant: Lenovo (Singapore) Pte. Ltd., Singapore (SG)

(72) Inventors: Robert J. Kapinos, Durham, NC (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/815,208

(22) Filed: Jul. 26, 2022

(65) Prior Publication Data
US 2024/0036794 A1 Feb. 1, 2024

(51) Int. Cl.
G06F 3/14 (2006.01)
G06F 3/0481 (2022.01)
G06F 3/0482 (2013.01)

(52) U.S. Cl.
CPC .......... *G06F 3/1423* (2013.01); *G06F 3/0481* (2013.01); *G06F 3/0482* (2013.01)

(58) Field of Classification Search
CPC .. G06F 3/1423; G06F 3/0482; G06F 3/04812; G06F 3/04842; G06F 3/04883; G06F 3/038; G09G 2354/00; G09G 2340/04; G09G 5/08; G09G 2320/08; G09G 5/38; G09G 2340/0464; G09G 2356/00; H04N 23/631
See application file for complete search history.

(56) References Cited

U.S. PATENT DOCUMENTS

| | | | |
|---|---|---|---|
| 5,929,840 A | 7/1999 | Brewer et al. | |
| 9,588,604 B2 | 3/2017 | Zheng et al. | |
| 11,003,839 B1 | 5/2021 | Hatch | |
| 11,336,946 B1 | 5/2022 | Gheen | |
| 11,462,194 B1* | 10/2022 | Wang | G06F 1/165 |
| 2005/0007351 A1 | 1/2005 | Fabrick | |
| 2006/0288314 A1* | 12/2006 | Robertson | G06F 3/04842 715/858 |
| 2012/0062457 A1 | 3/2012 | Lee et al. | |
| 2012/0194427 A1* | 8/2012 | Lee | G06F 3/033 345/157 |
| 2012/0272179 A1* | 10/2012 | Stafford | G06F 3/0482 345/157 |

(Continued)

OTHER PUBLICATIONS

Nicholson et al., "Assigning Logical Position of Additional Display Based on Cursory Movement", file history of related U.S. Appl. No. 17/567,858, filed Jan. 3, 2022.

(Continued)

*Primary Examiner* — Matthew A Eason
*Assistant Examiner* — Sujit Shah
(74) *Attorney, Agent, or Firm* — John M. Rogitz; John L. Rogitz (57) ABSTRACT In one aspect, a device includes at least one processor and storage accessible to the at least one processor. The storage includes instructions executable by the at least one processor to identify a motion vector of a cursor presented on a first display and, based on identification of the motion vector, present the cursor on a second display located in a direction indicated by the motion vector.

20 Claims, 8 Drawing Sheets

(56) References Cited

U.S. PATENT DOCUMENTS

| | | | |
|---|---|---|---|
| 2013/0179781 A1 | 7/2013 | Nan et al. | |
| 2014/0040833 A1 | 2/2014 | McLean | |
| 2015/0033183 A1* | 1/2015 | Voorhees | G06F 3/04847 |
| | | | 715/801 |
| 2015/0268740 A1* | 9/2015 | Herbert | G06F 3/04812 |
| | | | 345/157 |
| 2015/0339090 A1 | 11/2015 | Lee et al. | |
| 2016/0124519 A1* | 5/2016 | Kamiya | G06F 3/04812 |
| | | | 345/157 |
| 2016/0162243 A1 | 6/2016 | Neisler et al. | |
| 2017/0103733 A1* | 4/2017 | Li | G06T 3/60 |
| 2017/0351396 A1 | 12/2017 | Passeri et al. | |
| 2018/0046423 A1* | 2/2018 | Abraham | G09G 5/30 |
| 2018/0292973 A1 | 10/2018 | Kung | |
| 2018/0367862 A1* | 12/2018 | Horii | H04N 21/4668 |
| 2019/0373445 A1 | 12/2019 | Floury | |
| 2019/0384481 A1 | 12/2019 | Bender et al. | |
| 2020/0167056 A1 | 5/2020 | Bender et al. | |
| 2020/0333994 A1 | 10/2020 | Sepulveda et al. | |
| 2021/0096730 A1* | 4/2021 | Greenebaum | G06F 3/04842 |
| 2021/0240332 A1 | 8/2021 | Walkin et al. | |
| 2021/0289263 A1 | 9/2021 | Yu et al. | |
| 2021/0311556 A1* | 10/2021 | Topal | G06V 40/169 |
| 2022/0014728 A1* | 1/2022 | Deighton | G09G 3/03 |
| 2022/0100325 A1* | 3/2022 | Groezinger | G06F 3/0481 |
| 2022/0182820 A1* | 6/2022 | Ferren | H04W 12/126 |
| 2022/0260669 A1* | 8/2022 | Garner | G01S 3/80 |
| 2023/0177855 A1* | 6/2023 | Singh | G02B 27/017 |
| | | | 382/176 |

OTHER PUBLICATIONS

Xu, Eric, "The All-Rounder Laptop: Lenovo ThinkBook 14s Yoga Review!", retrieved from https://www.techreviewed.xyz/.

* cited by examiner

MOVEMENT OF CURSOR BETWEEN DISPLAYS BASED ON MOTION VECTORS

FIELD

The disclosure below relates to technically inventive, non-routine solutions that are necessarily rooted in computer technology and that produce concrete technical improvements. In particular, the disclosure below relates to techniques for movement of a cursor between displays based on motion vectors.

BACKGROUND

As recognized herein, various implementations of mouse cursor movement typically only allow the cursor to move to adjacent displays via edge matching using pixel boundaries, which only works when the displays are right next to each other. As also recognized herein, this becomes unsatisfactory when the user wishes to use relatively larger displays and stationary displays that might otherwise be used for wireless casting but that are not located right next to each other. Thus, the disclosure below recognizes that when larger displays are mixed with smaller displays, it is often difficult or impossible to make three or more of those displays adjacent to each other on both the X and Y axis for cursor movement. There are currently no adequate solutions to the foregoing computer-related, technological problems.

SUMMARY

Accordingly, in one aspect a device includes at least one processor and storage accessible to the at least one processor. The storage includes instructions executable by the at least one processor to identify a motion vector of a cursor presented on a first display and, based on identification of the motion vector, present the cursor on a second display located in a direction indicated by the motion vector. The second display is different from the first display.

Thus, in certain example implementations the instructions may be executable to, based on identification of the motion vector, identify the second display as being located in the direction indicated by the motion vector. The instructions may then be executable to, based on the identification of the second display as being located in the direction indicated by the motion vector, present the cursor on the second display. For instance, the instructions may be executable to identify the second display as being located in the direction indicated by the motion vector based on an assumption that the first and second displays are coplanar. As another example, the instructions may be executable to identify the second display as being located in the direction indicated by the motion vector based on an arc of the second display with respect to the first display relative to a user and based on known sizes of the first and second displays, where a position of the user may be assumed to be within a threshold range relative to a reference display. The reference display may be one of the first and second displays and the threshold range may even vary in some examples based on a display type for the reference display, where the display type may be selected from a mobile device display, a stand-alone computer monitor, and/or a television. Thus, in one specific example embodiment the instructions may be executable to identify the second display as being located in the direction indicated by the motion vector based on an angle of view to the second display, where the angle of view is determined based on the position of the user, the arc of the second display with respect to the first display relative to the user, and the known size of the second display. The angle of view may be determined based on an identified distance of the second display from the user, where the identified distance may be identified based on one or more display settings associated with the second display as stored at the device. E.g., the identified distance may be identified based on receipt of one or more wireless signals that indicate a location of the second display, such as ultrawideband (UWB) signals, Wi-Fi signals, Bluetooth signals, and/or wireless signals indicating global positioning system (GPS) coordinates.

Also in some example implementations, the instructions may be executable to present the cursor on the second display based on the identification of the motion vector and based on the cursor reaching an edge of the first display.

Also in various example implementations, the device itself may include the first display and the second display.

In another aspect, a method includes identifying a motion vector of a cursor presented on a first display and, based on identifying the motion vector, presenting the cursor on a second display located in a direction indicated by the motion vector. The second display is different from the first display.

Thus, in some example implementations the method may include presenting the cursor on the second display based on an assumption that the first and second displays are coplanar.

Also in some example implementations, the method may include identifying the second display as being located in the direction indicated by the motion vector based on an angle of view to the second display, where the angle of view may be determined based on a distance of the second display from a user, an arc of the second display with respect to the first display relative to the user, and the known size of the second display.

Still further, if desired the first and second displays may be arranged with respect to each other such that the first and second displays are coplanar but non-adjacent, in parallel planes but different depths, diagonally located with respect to each other from a user's perspective, and/or in different orientations where the different orientations may include landscape and portrait orientations.

In still another aspect, at least one computer readable storage medium (CRSM) that is not a transitory signal includes instructions executable by at least one processor to identify a motion vector of a cursor presented on a first display and, based on identification of the motion vector, present the cursor on a second display located in a direction indicated by the motion vector. The second display is different from the first display.

Thus, in certain examples the first display may include a computer monitor and the second display may include a television.

The details of present principles, both as to their structure and operation, can best be understood in reference to the accompanying drawings, in which like reference numerals refer to like parts, and in which:

DETAILED DESCRIPTION

Among other things, the detailed description below discusses devices and methods to move a cursor (such as a mouse cursor or trackpad cursor) to any connected display based on cursor motion vectors, facilitating natural interactions for end-users. Thus, the mouse/trackpad/other input device's driver may be used to identify the cursor motion itself. The motion vector may then be determined to move the cursor from one display to another based on and in the path of the vector.

Thus, even if the displays do not physically share edges, logical positioning of the displays can be assigned (e.g., so that the logical positioning of the edges of disparate displays are considered to be abutting). This may be done through operating system-level logical display settings. In some specific examples, the user can tell the OS that certain monitors are "adjacent" and then the user can put monitors where they want to put them, with the device relying on a certain amount of good faith on user. Accordingly, in using motion vectors and other principles below, in example embodiments 3D spatial placement of displays may be collapsed into 2D planar space for the computing device to operate using 2D display management. The computing device may then do other display calculations in 2D space, where the 2D space may not be based on the actual, real-world size or area of each display but based on angular coverage. E.g., the device can normalize a farther display to move a cursor as if the farther display is actually located at the same distance from the user as another display in planar space (e.g., the farther display is considered a smaller display at a lesser distance).

Additionally, any connected display may be used as a reference display so that the reference display need not be the nearest of all connected displays to the user. In some examples, a middle or mid-range display may be used as the reference display as this may be computationally easier in some examples.

Additionally, the computing device may use the user's actual, real-world eye location in examples where it knows or detects it. However, in other examples the computing device may assume the user is, e.g., half a meter to one meter away from the nearest display (nearest to the computing device itself). Other displays may then be normalized based on that.

The disclosure below further recognizes that there might be instances where the display is attached to a device of a particular device type, such as a smartphone display of a smartphone or tablet display of a tablet. In instances like this, the assumed user position with respect to the nearest display may vary based on device/display type. E.g., for mobile device display types and/or hand-held display types like smartphone displays, the assumed range may be less (e.g., 0.333 meters) than if the display where a laptop display or stand-alone computer monitor (e.g., the aforementioned half a meter to one meter). Then for yet another display type—televisions or monitors above a threshold size—the assumed range may be even farther such as ten meters away.

The disclosure below also recognizes that in certain circumstances, instead of using planar space, if the connected displays are really far around the user's virtual sphere, the device may also use spherical coordinate math/polar math for display mapping and cursor movement.

The disclosure below further recognizes that present principles may be used for displays of various types, sizes, and orientations. For example, a cursor may be moved from a landscape-oriented display to a portrait-oriented display and vice versa. Cursors may also be moved between a smartphone display and a stand-alone display, or from a rectangular display to an oval or circular display (or a display of any other front-plane shape).

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C#or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
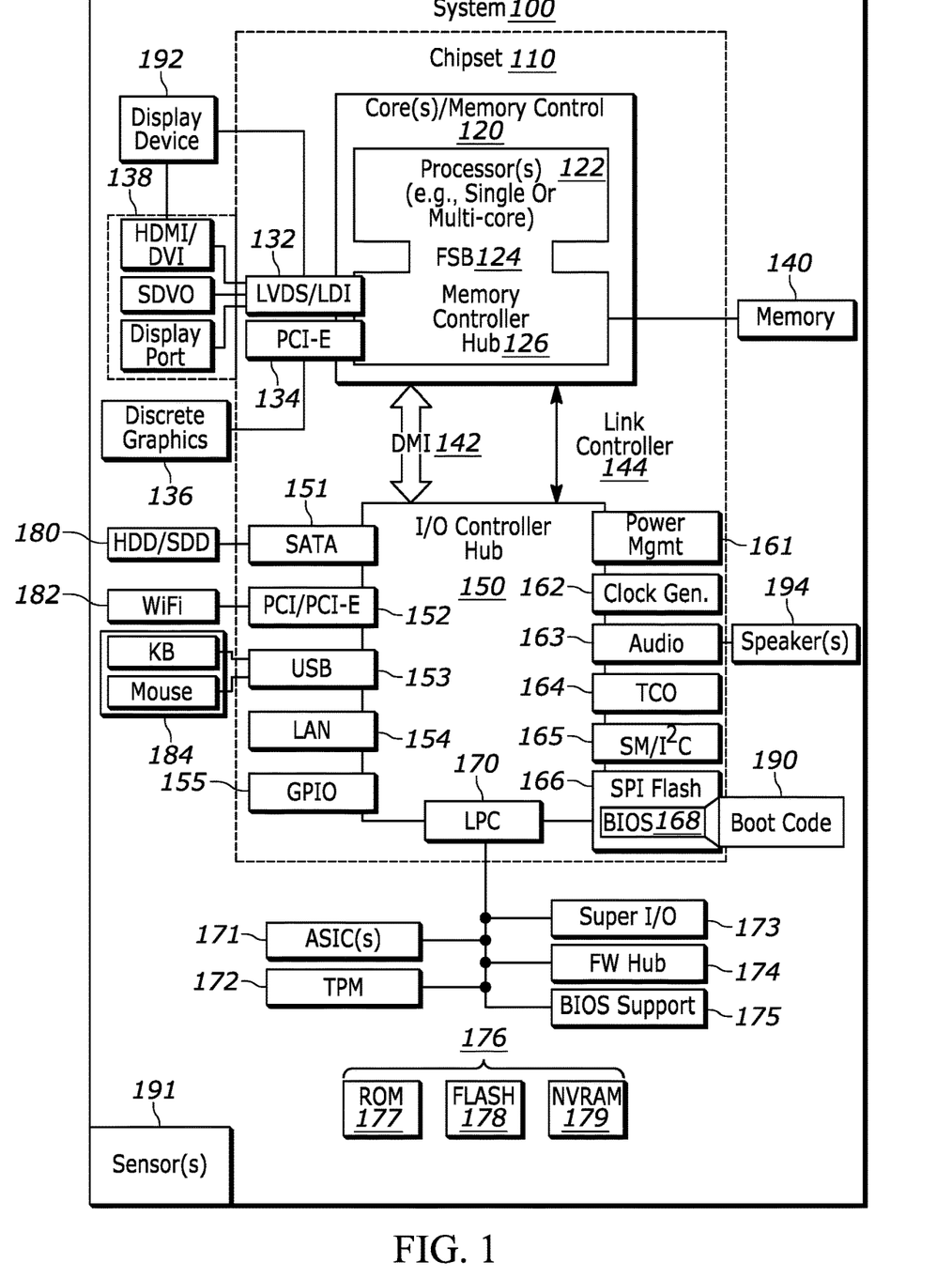
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include one or more sensors 191, such as a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Still further, the sensors 191 may include an audio receiver/microphone that provides input from the microphone to the processor 122 based on audio that is detected, such as via a user providing audible input to the microphone.

The sensors 191 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather still images and/or video. Also, the sensors 191 may include a global positioning system (GPS) transceiver that is configured to communicate with satellites to receive/identify geographic position information and provide the geographic position information to the processor 122. However, it is to be understood that another suitable position receiver other than a GPS receiver may be used in accordance with present principles to determine the location of the system 100.

The sensors 191 may also include ultrawideband (UWB) transceivers configured to transmit and receive data using UWB signals and UWB communication protocol(s), such as protocols set forth by the FiRa Consortium. UWB may use low energy, short-range, high-bandwidth pulse communication over a relatively large portion of the radio spectrum. Thus, for example, an ultra-wideband signal/pulse may be established by a radio signal with fractional bandwidth greater than 20% and/or a bandwidth greater than 500 MHz. UWB communication may occur by using multiple frequencies (e.g., concurrently) in the frequency range from 3.1 to 10.6 GHz in certain examples. To transmit UWB signals consistent with present principles, the transceiver 191 itself may include one or more Vivaldi antennas and/or a MIMO (multiple-input and multiple-output) distributed antenna system, for example. It is to be further understood that various UWB algorithms, time difference of arrival (TDoA) algorithms, and/or angle of arrival (AoA) algorithms may be used for the system 100 to determine the distance to and location of another UWB transceiver on another device that is in communication with the UWB transceiver 191 on the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
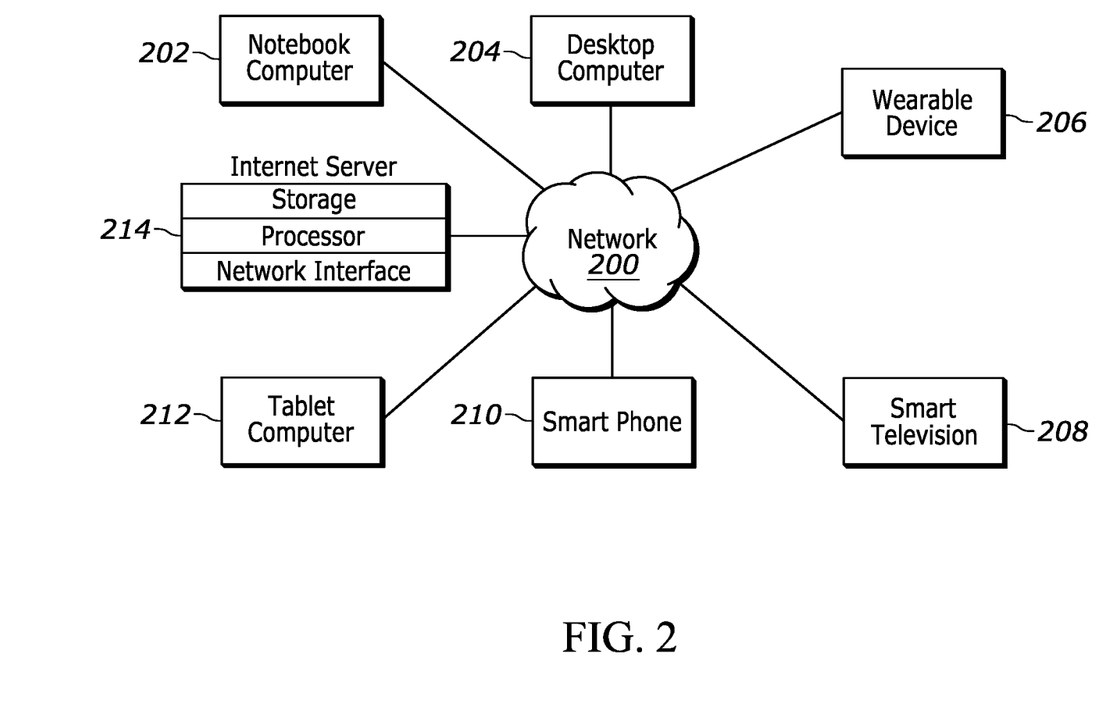
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
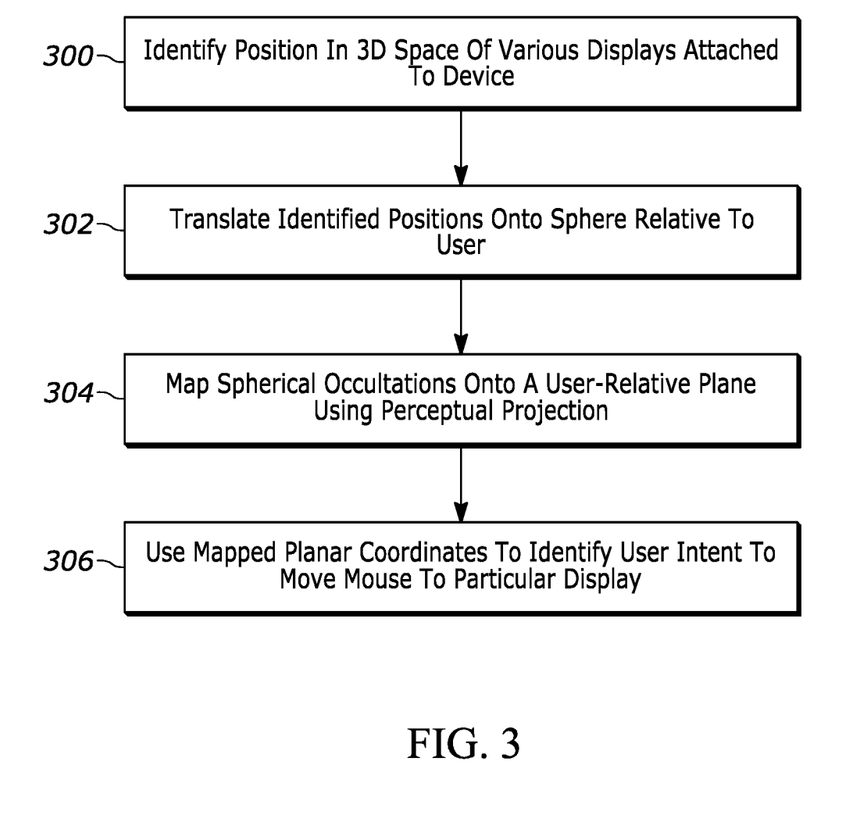
FIGS. 3 and 9 illustrate example logic in example flow chart format that may be executed by a device consistent with present principles.

Now in reference to FIG. 3, it shows example logic that may be executed by a device such as the system 100 for display management and location mapping consistent with present principles. Note that while the logic of FIG. 3 is shown in flow chart format, other suitable logic may also be used.

Beginning at block 300, the device may identify the position/location in real-world 3D space of various displays that are communicatively attached to the device (e.g., in wireless and/or wired communication with the device). For instance, computer vision may be executed using input from a camera on the device and/or elsewhere within the same environment to identify the locations of the various displays. Additionally or alternatively, ultra-wideband (UWB) location tracking may be used to identify the locations of the various displays using UWB transceivers located in each display and located in the device itself. GPS coordinates reported to the device by GPS transceivers on each display may also be used. Or Wi-Fi signals or Bluetooth signals may be used (e.g., with the signals reporting location coordinates and/or being used in combination with triangulation to triangulate one or more display locations based on the known locations of certain other displays and/or the device itself). The display locations may then be stored in device settings (e.g., guest operating system settings).

As another example, the user may manually enter/specify the display locations into the device's settings, such as by dragging and dropping representations of detected displays into their current real-world locations relative to each other along an X/Y projection plane using a graphical user interface (GUI).

From block 300 the logic may proceed to block 302. At block 302 the device may translate the identified display positions onto a virtual sphere, with the user's head being located at the center of the sphere and with the radius of the sphere being established as the linear distance between the user's head and the front plane of the farthest display for which location is identified. The location of the user's head may itself be identified using computer vision and input from one of the cameras mentioned above, for example. Additionally or alternatively, the location of the user's head may be assumed to be a threshold distance from a reference display, such as a laptop display where the device executing the logic of FIG. 3 is the physically-attached laptop itself. As another example, the user may have manually entered his/her location and/or distance from the reference display into settings of the device.

After block 302 the logic may move to block 304. At block 304 the device may map the spherical occultations onto a user-relative plane using a perceptual projection to establish planar coordinates for each display. An example perceptual projection will be described shortly in reference to FIG. 4.

From block 304 the logic may then proceed to block 306. At block 306 the device may use the mapped planar coordinates to identify an end-user's intent to move a mouse/cursor to a particular one of the plural displays that has been mapped onto the user-relative plane.

Thus, it may be appreciated from FIG. 3 that the device may identify adjacent, non-adjacent, and non-contiguous displays in display arrangement space to consider the displays as a set of screens represented on a logical plane (e.g., in Cartesian coordinate space), "connected" in various ways by the user, possibly sharing certain X-Y display borders and/or physically contiguous display surfaces. Borders of displays at different depths may therefore be matched to virtually produce adjacent screens, the relationship of contiguous but non-adjacent screens to each other may be identified, disparately-connected displays may be identified, and logically contiguous display surfaces comprised of adjacent, disparate, and/or non-adjacent screens/displays may be identified.

Figure 4:
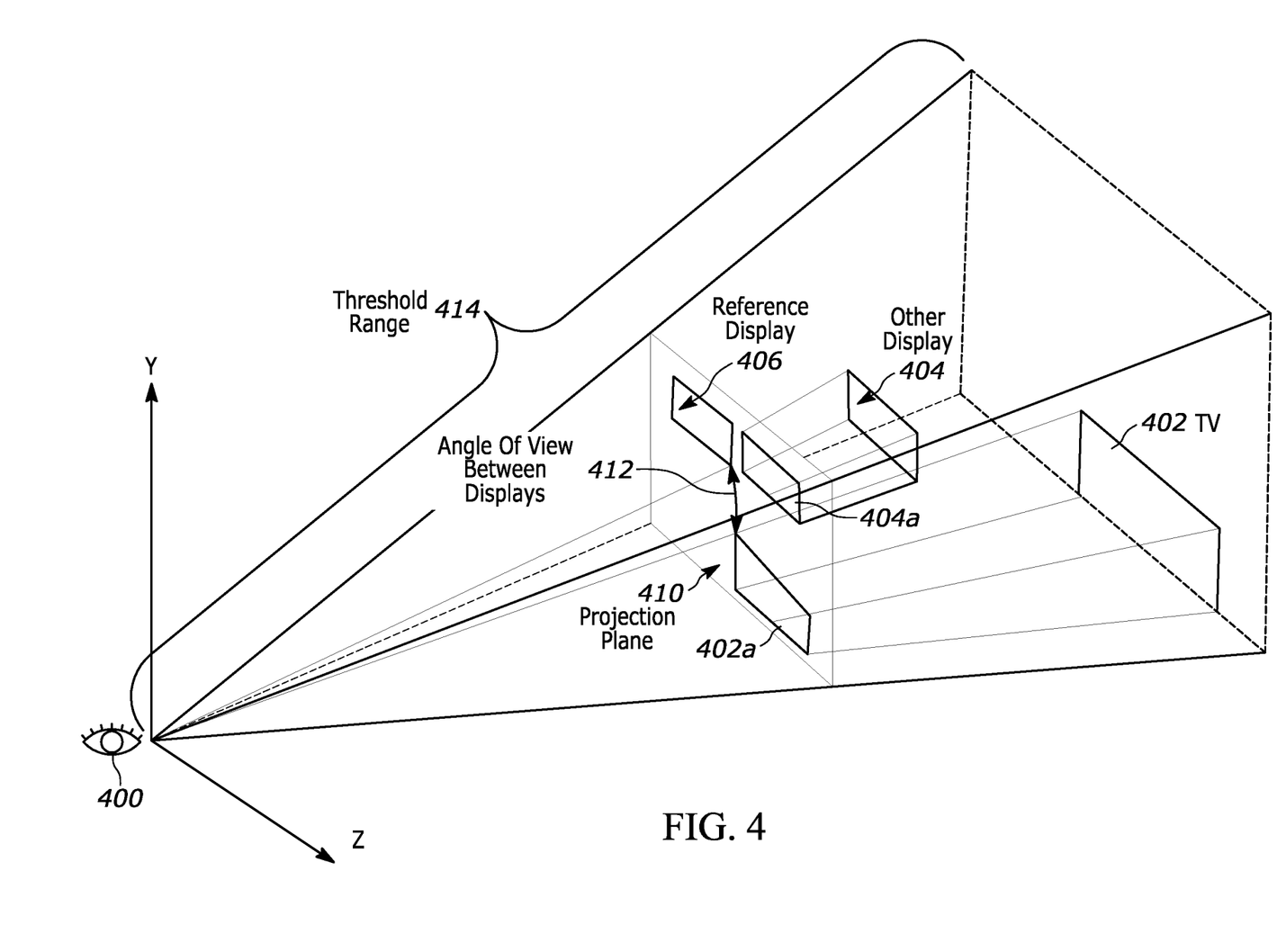
FIG. 4 shows a schematic diagram for determining a projection plane consistent with present principles.

Now in reference to FIG. 4, it shows a schematic diagram illustrating the plane described above, which may be considered a projection plane for the device to use for logical display positioning. A user's eyes/head 400 are located at a first location. A farthest display 402 from the user (that is in communication with the device executing the logic described above) may be established by a television mounted on a wall of a personal residence in this example. Other displays 404, 406 are also located at different depths from the user 400 at distances that are between the user 400 and display 402. Note that each of the displays 402, 404, and 406 not only has a different depth relative to the user 400 but also has different X-Y coordinates as well. Further note that the display 406 is the reference display in this example since it is the nearest display to the user 400 and, as such, the real-world plane of its front surface facing the user 400 (and from which light emanates) will establish the projection plane 410.

The three displays at varying depths may then be mapped onto the projection plane 410. Thus, the projection plane may include the reference display 406, virtual projection 404a of the display 404, and virtual projection 402a of the display 402. An angle of view 412 between the displays 402-406 along the projection plane 410 may then be identified. Note here that the X-Y dimensions of the virtual projections 402a, 404a establish smaller areas than the actual areas of the front planes of the real-world displays 402, 404 themselves owing to the user's angle of view 412 relative to the displays 402, 404 and the plane 410 being nearer to the user 400 than the displays 402, 404. However, in other examples where the reference display might not be the closest display to the user, displays nearer to the user than the reference display might occupy a larger virtual area on the projection plane than their real-life front-plane areas. Regardless, more generally these projections are assumed to correspond to the logical display arrangement maintained by the device itself for cursor movement.

Before moving on to other figures, also note that a threshold range 414 is shown. The range 414 is understood to establish the bounds of the user's viewing angle to the respective displays as projected from the user 400 to farthest display 402, with the corresponding pyramid established along lines from the user's eye(s) 400 past respective corners of the projection plane 410 and encompassing all connected displays with the user's view.

Figure 5:
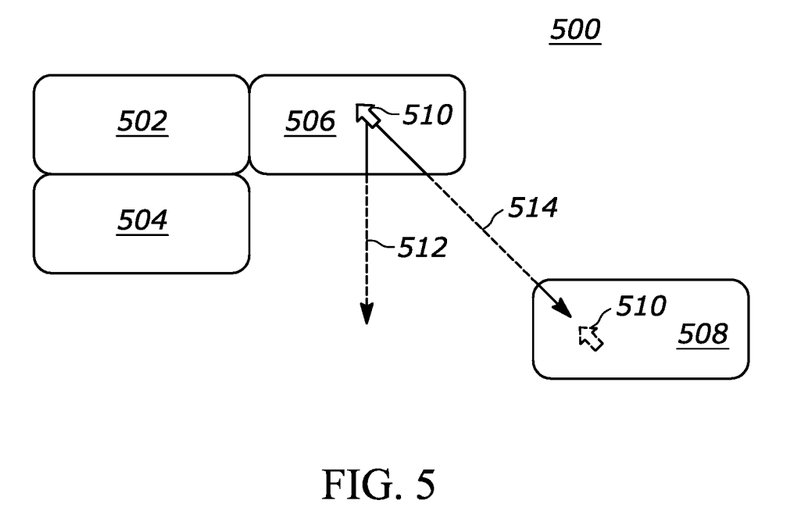
FIGS. 5-8 show various examples of cursor movement between displays of various types and real-world configurations in real-world space consistent with present principles.

Now in reference to FIG. 5, a projection plane 500 is shown along with displays 502, 504, 506 that are physically contiguous via adjacent sides. Also shown is a disparate display 508 that is not physically contiguous/connected to the other displays 502-504 via a respective side of the display 508. As also shown in FIG. 5, a cursor 510, which in this case is a mouse cursor/pointer, is currently being presented by the controlling device itself (e.g., a desktop computer) on the display 506.

If the user were to move the cursor 510 straight down in the plane 500 to engage or abut a bottom screen edge of the display 506, the device controlling the displays 502-508 may identify and project a motion vector 512 into space along the estimated line of mouse motion to determine that the vector does not overlap/intersect any other display that is beyond the bottom screen edge of the display 506 in the plane 500 and in the direction of the motion vector 512. As such, despite the cursor 510 abutting the bottom edge along the line of the vector 512, the device does not remove the cursor 510 from being presented on the display 506 and continues to maintain it as being presented at the bottom edge of the display 506 at a location along the vector 512.

However, if the user were to instead move the cursor 510 diagonally down in the plane 500 to engage or abut a bottom right corner of the display 506, the device controlling the displays 502-508 may identify and project a motion vector 514 into space along the estimated line of mouse motion to determine that the vector does in fact overlap/intersect the disparate, isolated display 508 that is beyond the bottom right corner edge of the display 506 in the plane 500 and in the direction of the motion vector 514. As such, once the cursor 510 reaches the bottom right edge of the display 506 (and, e.g., either remains there for a threshold amount of time or goes back and forth to repeatedly strike the bottom right corner, which in either case may be used as the trigger to help reduce false positives), the cursor 510 may be removed from presentation on the display 506 and may instead be presented at a nearest edge portion of the display 508 in the direction of the motion vector 514, which in this case is the upper left edge of the display 508, as also shown in FIG. 5. Cursor motion may then continue in the direction of the vector 514 on the display 508 or, based on a change in direction of mouse motion itself, change directions on the display 508.

Figure 6:
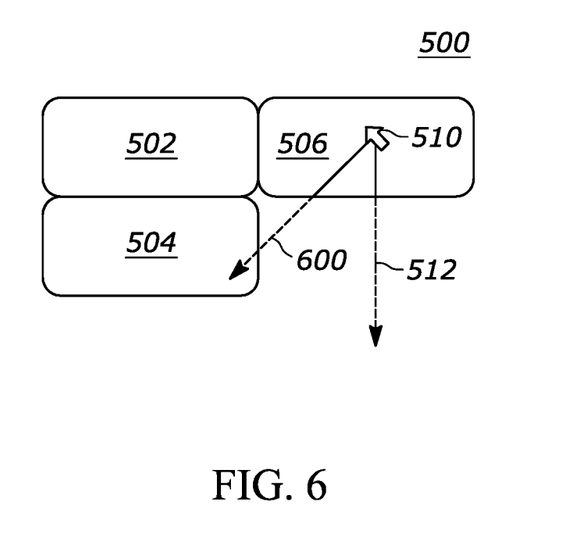

Continuing the detailed description with reference to FIG. 6 to provide another example, the projection plane 500 is again shown along with the displays 502, 504, 506 that are physically contiguous via adjacent sides. However, note here that the display 508 is no longer in play, either because it has been powered off, disconnected from the controlling computing device, etc. And here again the cursor 510 is currently being presented by the controlling device on the display 506.

Per this example, here again if the user were to move the cursor 510 straight down in the plane 500 to engage or abut a bottom screen edge of the display 506, the device controlling the displays 502-506 may identify and project the motion vector 512 into space along the estimated line of mouse motion to determine that the vector does not overlap/intersect any other display that is beyond the bottom screen edge of the display 506 in the plane 500 and in the direction of the motion vector 512. As such, despite the cursor 510 abutting the bottom edge along the line of the vector 512, the device does not remove the cursor 510 from being presented on the display 506 and continues to maintain it as being presented at the bottom edge of the display 506 at a location along the vector 512 as described above.

However, also per this example if the user were to instead move the cursor 510 diagonally down in the plane 500 to engage or abut a bottom edge of the display 506 in the direction of the display 504, the device controlling the displays 502-506 may identify and project a motion vector 600 into space along the estimated line of mouse motion to determine that the vector does in fact overlap/intersect the disparate display 504 (disparate relative to the display 506 since no contiguous/physically connected sides even though connected by the intermediate display 502) that is beyond the bottom edge of the display 506 in the plane 500 and in the direction of the motion vector 600. As such, once the cursor 510 reaches the bottom edge of the display 506 (and, e.g., either remains there for a threshold amount of time or goes back and forth to repeatedly strike the bottom right corner, which in either case may be used as the trigger to help reduce false positives as described above), the cursor 510 may be removed from presentation on the display 506 and may instead be presented at a nearest edge portion of the display 504 in the direction of the motion vector 600, which in this case is a right-side edge of the display 504. Cursor motion may then continue in the direction of the vector 600 on the display 504 or, based on a change in direction of mouse motion itself, change directions on the display 504.

Figure 7:
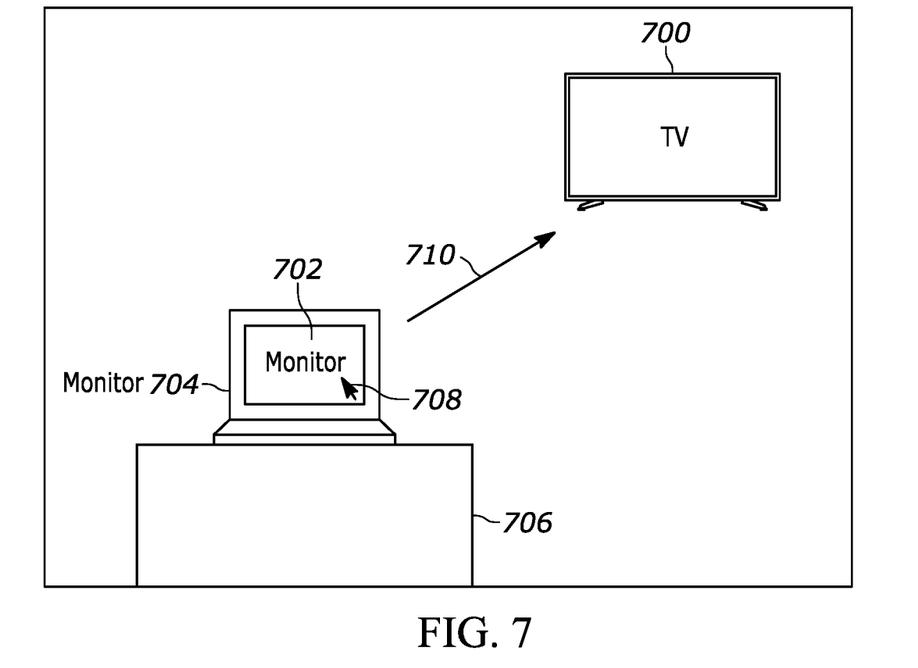

FIG. 7 further illustrates present principles, demonstrating non-contiguous displays in the form of a wall-mounted television 700 and computer monitor 702 of a laptop computer 704. It is to be understood that here the displays 700, 702 are being used in tandem to present different parts of a same desktop, window, graphical user interface (GUI), etc. It is to be further understood that the displays 700, 702 are located at different depths relative to a user that is sitting in front of the laptop 704, with the laptop 704 itself being placed on a desk 706.

As shown in FIG. 7, a cursor 708 is currently being presented on the display 702 but motion vector 710 indicates that the user is attempting to move the cursor 708 to the display 700. As such, when the cursor 708 reaches an edge portion of the display 702, the laptop may transition the cursor from presentation on the display 702 to presentation on the display 700 (e.g., to select a button or other content presented on the display 700 by the laptop 704).

Figure 8:
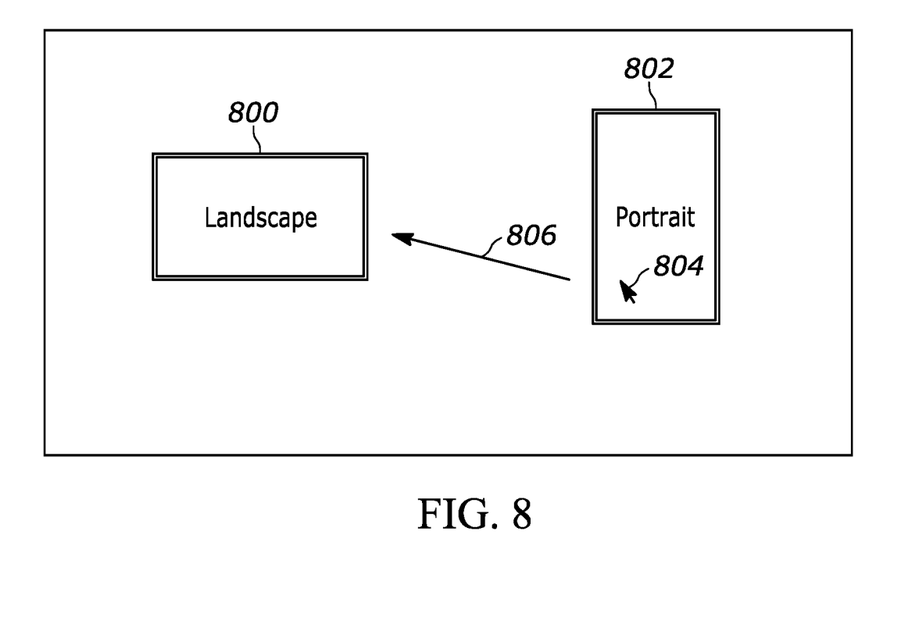

FIG. 8 demonstrates another example implementation. Here a first display 800 oriented in 3D real-world space in landscape orientation is being used in tandem with a display 802 that is oriented in 3D real-world space in portrait orientation. A cursor 804 may move from the display 802 to the display 800 according to direction of a motion vector 806 consistent with present principles.

Figure 9:
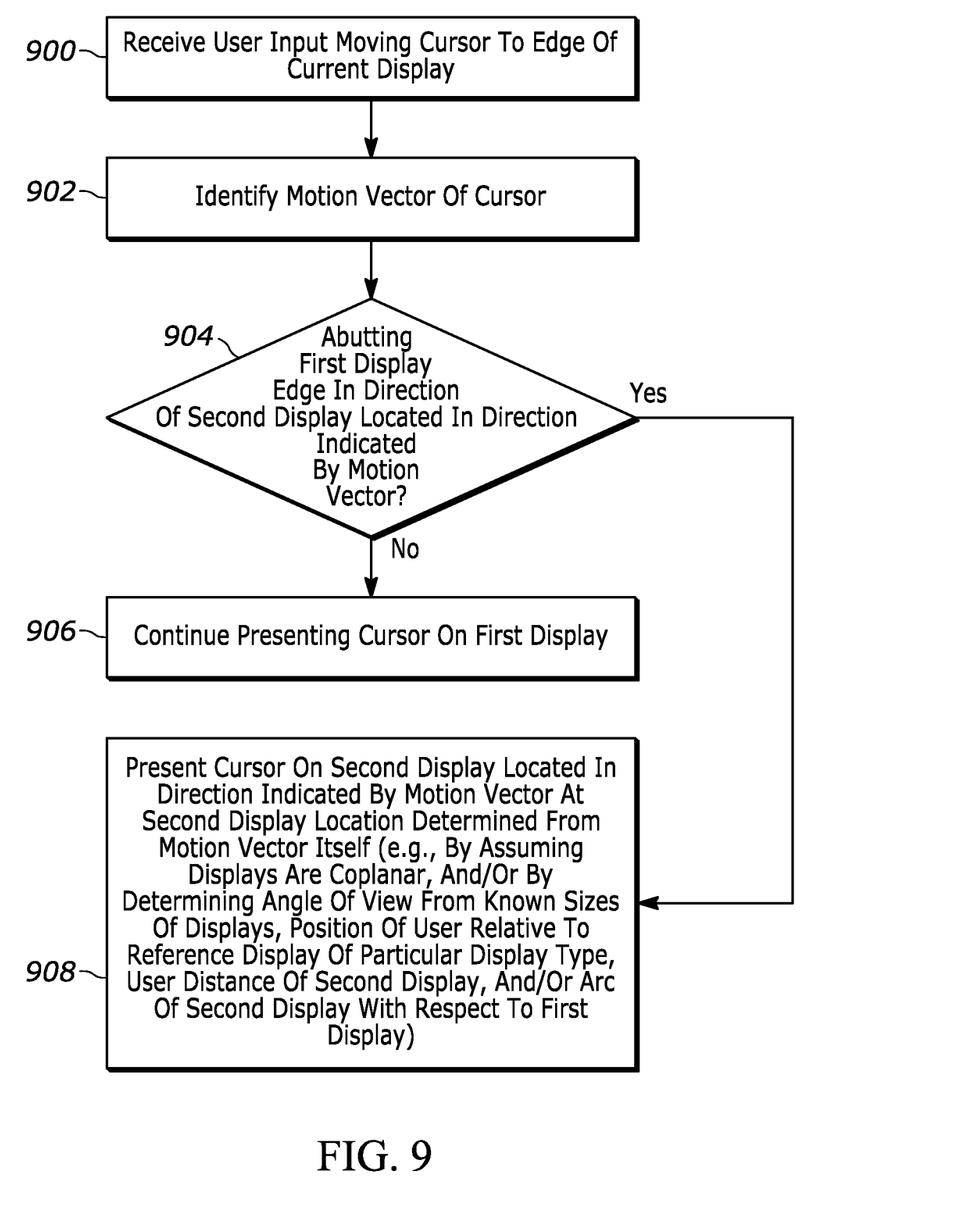

Now in reference to FIG. 9, it shows example overall logic that may be executed by a device such as the system 100, the laptop 704, or another device that controls multiple displays to move a cursor between displays consistent with present principles. Note that while the logic of FIG. 9 is shown in flow chart format, other suitable logic may also be used.

Beginning at block 900, the device may receive user input moving a cursor to an edge of a first display, whether the cursor is a mouse pointer or even an i-beam cursor, text cursor, or other type of cursor. This may establish a trigger to identify a motion vector for the cursor and possibly move the cursor to a different display consistent with present principles, though in some instances the trigger may be established not just by moving the cursor to the first display's edge but also continuing to move the cursor off screen, keeping the cursor at the edge location for a threshold amount of time, or even controlling the cursor to go back and forth to strike the edge location at least twice within a threshold amount of time (e.g., to help reduce false positives where the user might not have intended to move the cursor to another display based on unintended or brief single movement to the edge location).

Thus, if the trigger is not detected, the logic may stop or continue moving the cursor around the first display. Or in some specific examples, if the motion is in the direction of a known adjacent display, the device may move the cursor to that display along a line indicated by mouse motion itself without determining a motion vector for 3D-to-2D space according to the description above.

But assuming the trigger has been met, the logic may proceed to block 902 where the device may identify a motion vector of the cursor to, at decision diamond 904, determine whether the cursor is abutting an edge of the first display in a direction of a second display that is located in the direction indicated by the motion vector.

Responsive to a negative determination at diamond 904 (e.g., there is no known display located in the direction), the logic may move to block 906 where the device may continue presenting the cursor on the first display according to mouse motion or other input from the end-user. However, responsive to an affirmative determination at diamond 904, the logic may instead move to block 908. At block 908 the device may, based on identification of the motion vector, present the cursor on a second display located in a direction indicated by the motion vector at a display location on the second display that is determined from the motion vector itself.

Thus, the device may assume the displays are coplanar (e.g., assumed to be in the same projection plane as described above). The device may also identify the second display as being located in the direction indicated by the motion vector based on an arc of the second display with respect to the first display relative to the user and based on known sizes of the first and second displays (e.g., as reported by the displays/display drivers themselves). The position of the user may be assumed to be within a threshold range of a reference display as described above, where the reference display may be one of the first and second displays. In some examples, the threshold range may vary based on a display type for the reference display, such as the display type being a mobile device display (e.g., smartphone or tablet display), a stand-alone computer monitor, or a television as also described above.

Accordingly, to identify the second display as being located in the direction indicted by the motion vector, in various example implementations the device may determine an angle of view of the user to the second display based on the known/assumed position of the user, identified distance of the second display from the user, arc of the second display with respect to the first display, and known size of the second display.

Again note that the identified distance of the second display from the user may be identified based on one or more display settings stored at the device and associated with the second display. The identified distance may be stored in display settings once manually indicated by a user as described herein, once programmed by a developer as an assumption of a relatively small default distance range, and/or once identified based on receipt of one or more wireless signals that indicate a location of the second display as described above (such as UWB signals, Wi-Fi signals, Bluetooth signals, wireless signals indicating global positioning system (GPS) coordinates, etc.).

Thus, the cursor may move from the first display to the second display, whether the first and second displays are arranged with respect to each other such that the first and second displays are coplanar but non-adjacent, in parallel planes but different depths, diagonally located with respect to each other from a user's perspective, or in different orientations (e.g., landscape and portrait orientations as described above).

Figure 10:
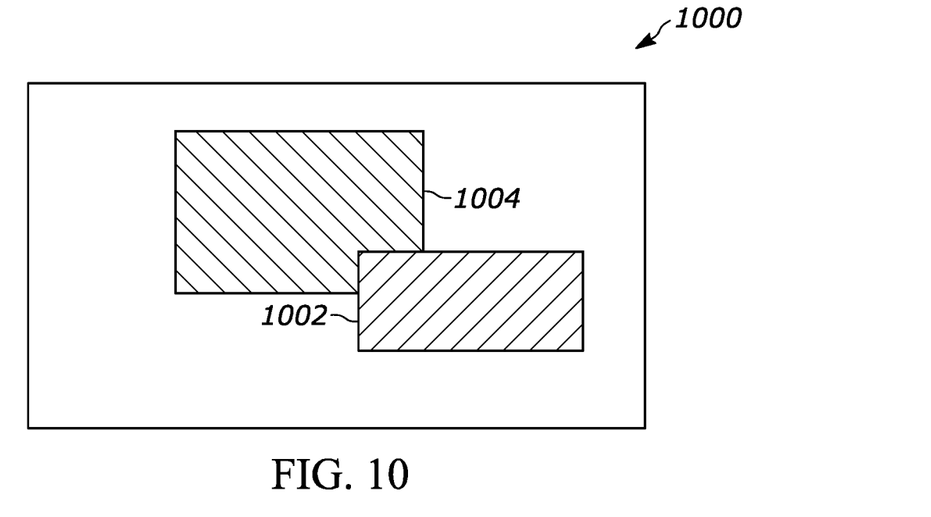
FIG. 10 shows an example of a multi-display configuration where two displays overlap each other according to the user's view per a projection plane consistent with present principles.

Now in reference to FIG. 10, now assume a multi-display configuration where two displays overlap each other according to the user's view per a projection plane 1000. FIG. 10 thus shows that an upper left portion of a nearer display 1002 (relative to the user) overlaps a bottom right portion of a farther display 1004. To handle that region of overlap, the device controlling the displays 1002, 1004 may decide that display 1002 in front owns that region of overlap. As such, the device may determine the motion vector of the cursor and move the cursor from the overlapping region owned by the display 1002 to the display 1004 once one of the upper left edges of the display 1002 is reached by the cursor. Therefore, the bottom right portion of the display 1004 that is obstructed from the user's view will not present the cursor in the obstructed area and instead the cursor may "jump" from the display 1002 more toward the middle of the display 1004 where the display overlap ends. Thus, a virtual, cut-out edge of the second display 1004 may be applied for transitioning the cursor from the display 1002 to the display 1004.

Figure 11:
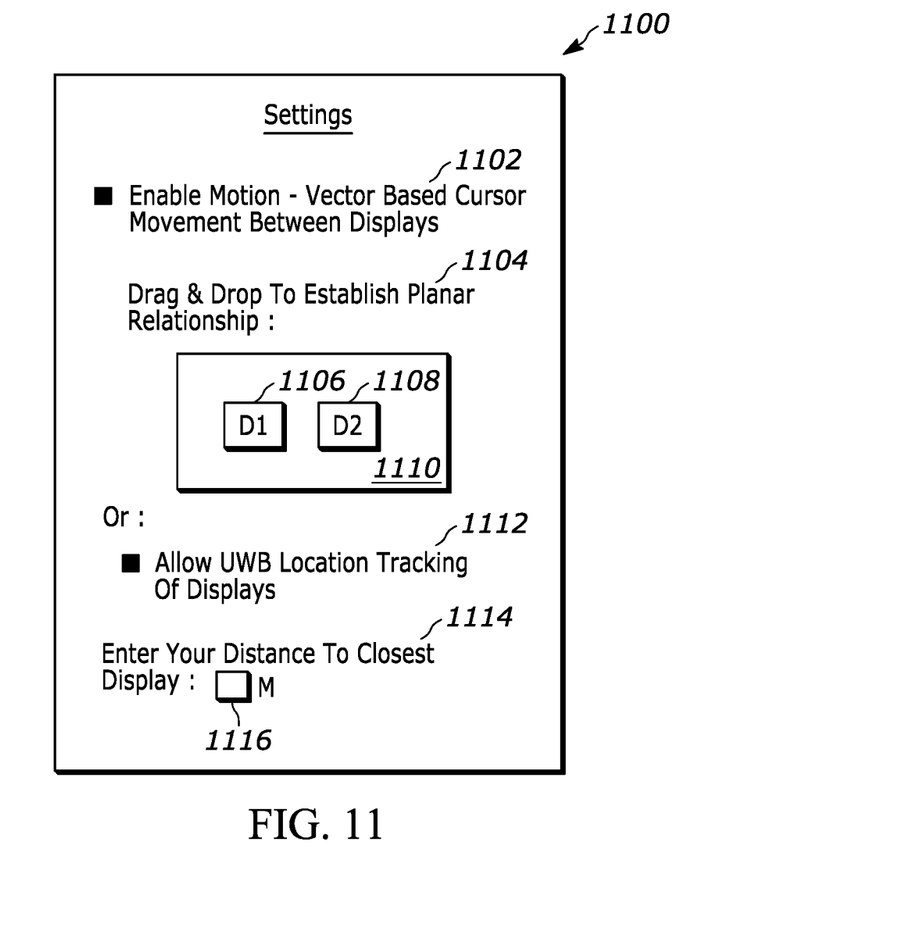
FIG. 11 shows an example settings graphical user interface (GUI) that may be used to configure one or more settings of a device to operate consistent with present principles.

Continuing the detailed description in reference to FIG. 11, it shows an example settings GUI 1100 consistent with present principles that may be presented on one or more displays of a connected device to configure/enable one or more settings related to cursor presentation. The settings GUI 1100 may be reached by navigating a settings menu of the device or a dedicated display management app menu, for example. Also note that in the example shown, each option discussed below may be selected by directing touch or cursor or other input to the respective check box adjacent to the respective option.

As shown in FIG. 11, the GUI 1100 may include an option 1102 that may be selectable a single time to set or configure the device/system to undertake present principles for multiple future cursor movement instances. For example, selection of the option 1102 may configure the device to execute the logic of FIGS. 3 and/or 9, as well as to execute the other actions described above for moving a cursor from one display to another.

In some examples, the GUI 1100 may also include a setting 1104 at which an end-user may provide manual input to establish the locations of various displays with respect to each other along a projection plane. Thus, a respective selector 1106, 1108, etc. for each display communicatively connected to the device itself may be presented in a representation 1110 of planar space for a user to drag and drop the selectors 1106, 1108 into a particular arrangement that represents the current real-world planar arrangement of the associated displays with respect to each other to thus establish corresponding logical display positions for the device to apply.

However, in addition to or in lieu of the user manually assisting with indicating the locations of the connected displays with respect to each other, the user may select the option 1112 to command the device to use electronic communication such as UWB location tracking or others mentioned above for the device to determine the locations of the displays with respect to each other.

Additionally, if desired the GUI 1100 may include a setting 1114 at which the end-user may enter a distance of the user to the nearest connected display via input box 1116 for the device to apply that distance in its calculations as set forth above.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
receive input from a camera;
execute computer vision to identify, based on the input from the camera, a location of a user;
use the identified location of the user to normalize a real-world position of a first display so that, for cursor movement, the first display is treated as being located at a same distance from a user as a second display;
identify a motion vector of a cursor presented on the first display;
based on identification of the motion vector, based on the normalization, and based on identification of the cursor striking an edge location of the first display at least two times within a threshold amount of time as a trigger to reduce false positives, present the cursor on the second display in a direction indicated by the motion vector, the second display being different from the first display.

2. The device of claim 1, wherein the instructions are executable to:
present a settings graphical user interface (GUI), the settings GUI comprising an option that is selectable a single time to set the device to, for multiple future instances of cursor movement, perform the identification and presentation steps to move the cursor from one display to another display.

3. The device of claim 1, wherein the instructions are executable to:
present a graphical user interface (GUI), the GUI comprising an interface for a user to indicate the locations of the first and second displays with respect to each other along a projection plane.

4. The device of claim 3, wherein the GUI comprises a first selector for the first display and a second selector for the second display, the first and second selectors being moveable through drag and drops for the user to indicate the locations of the first and second displays with respect to each other along the projection plane.

5. The device of claim 1, wherein the instructions are executable to:
identify respective locations of the first and second displays to move the cursor between the first and second displays, the locations being identified using ultrawideband location tracking.

6. The device of claim 1, wherein the instructions are executable to:
identify respective locations of the first and second displays to move the cursor between the first and second displays, the locations being identified using computer vision.

7. The device of claim 1, wherein the instructions are executable to:
identify respective locations of the first and second displays to move the cursor between the first and second displays, the locations being identified using global positioning system (GPS) coordinates.

8. The device of claim 1, wherein the instructions are executable to:
identify respective locations of the first and second displays to move the cursor between the first and second displays, the locations being identified using wireless signals to triangulate the respective locations.

9. The device of claim 1, comprising the first and second displays.

10. The device of claim 9, comprising the camera.

11. A method, comprising:
receiving input from a camera;
executing computer vision to identify, based on the input from the camera, a location of a user;
using the identified location of the user to normalize a real-world position of a first display so that, for cursor movement, the first display is treated by a device as being located at a same distance from a user as a second display;
identifying a motion vector of a cursor presented on the second display; and
based on identifying the motion vector, based on the normalization, and based on identification of the cursor striking an edge location of the second display at least two times within a threshold amount of time as a trigger to reduce false positives, presenting the cursor on the first display in a direction indicated by the motion vector, the second display being different from the first display.

12. A device, comprising:
at least one computer readable storage medium (CRSM) that is not a transitory signal, the at least one computer readable storage medium comprising instructions executable by at least one processor to:
receive input from a camera;
execute computer vision to identify, based on the input from the camera, a location of a user;
use the identified location of the user to normalize a real-world position of a first display so that, for cursor movement, the first display is treated as being located at a same distance from a user as a second display;
identify a motion vector of a cursor presented on the first display; and
based on identification of the cursor striking an edge location of the first display at least two times within a threshold amount of time as a trigger to reduce false positives and based on identification of the motion vector, present the cursor on the second display located in a direction indicated by the motion vector, the second display being different from the first display.

13. The device of claim 12, wherein the first and second displays at least partially overlap according to a user's view, the first display being nearer to the user than the second display, and wherein the instructions are executable to:
present the cursor on the second display by jumping the cursor toward a middle portion of the second display without first presenting the cursor at an edge portion of the second display according to the motion vector.

14. The device of claim 12, wherein the instructions are executable to:
present a graphical user interface (GUI), the GUI comprising an option that is selectable a single time to set the at least one processor to, for multiple future instances of cursor movement, perform the identification and presentation steps to move the cursor from one display to another display.

15. The device of claim 14, wherein the option is a first option, and wherein the GUI comprises a second option that is selectable to enable ultrawideband location tracking of the first and second displays, the second option being different from the first option.

16. The device of claim 15, wherein the GUI comprises a setting different from the first and second options, the setting being usable to enter a distance of the user to the nearest connected display of the first and second displays for the at least one processor to apply that distance in its cursor movement calculations.

17. The device of claim 12, comprising the at least one processor.

18. The device of claim 17, comprising one or more of the first and second displays.

19. The device of claim 18, comprising both of the first and second displays.

20. The device of claim 12, wherein the instructions are executable to:
user polar math to present the cursor on the second display located in the direction indicated by the motion vector.

* * * * *